US010945372B2

(12) United States Patent
Piersanti

(10) Patent No.: US 10,945,372 B2
(45) Date of Patent: Mar. 16, 2021

(54) FLEXIBLE HEAD PLATFORM OF CANVAS OR DRAPER WITH DOUBLE SWATHER AND ATTACHING DEVICE

(71) Applicant: METAL NOET S.R.L., Cordoba (AR)

(72) Inventor: Juan Carlos Piersanti, Cordoba (AR)

(73) Assignee: Metal Noet S.R.L., Provincia de Cordoba (AR)

(*) Notice: Subject to any disclaimer, the term of this patent is extended or adjusted under 35 U.S.C. 154(b) by 217 days.

(21) Appl. No.: 16/108,617

(22) Filed: Aug. 22, 2018

(65) Prior Publication Data

US 2019/0274249 A1 Sep. 12, 2019

(30) Foreign Application Priority Data

Mar. 12, 2018 (AR) .............................. 20180100573

(51) Int. Cl.
| *A01D 61/00* | (2006.01) |
| *A01D 67/00* | (2006.01) |
| *A01D 61/02* | (2006.01) |
| *A01D 57/20* | (2006.01) |

(52) U.S. Cl.
CPC ........... *A01D 61/002* (2013.01); *A01D 57/20* (2013.01); *A01D 61/02* (2013.01); *A01D 67/00* (2013.01)

(58) Field of Classification Search
CPC ...... A01D 61/002; A01D 67/00; A01D 61/02; A01D 57/20; A01D 43/04; A01D 34/04; A01D 67/005
See application file for complete search history.

(56) References Cited

U.S. PATENT DOCUMENTS

| 3,343,347 | A | * | 9/1967 | Burrough | ............. | A01D 43/077 |
| | | | | | | 56/11.2 |
| 3,695,015 | A | * | 10/1972 | Twidale | ................. | A01D 57/28 |
| | | | | | | 56/181 |
| 4,429,517 | A | * | 2/1984 | Lohrentz | ................. | A01D 57/20 |
| | | | | | | 198/314 |
| 4,512,140 | A | * | 4/1985 | Blakeslee | ............. | A01D 57/20 |
| | | | | | | 56/11.4 |
| 4,519,190 | A | * | 5/1985 | Blakeslee | ............. | A01D 57/20 |
| | | | | | | 56/181 |
| 4,522,018 | A | * | 6/1985 | Blakeslee | ............. | A01D 57/20 |
| | | | | | | 56/11.2 |

(Continued)

FOREIGN PATENT DOCUMENTS

| AR | 040227 | 3/2005 |
| AR | 076116 | 4/2014 |

(Continued)

*Primary Examiner* — Arpad Fabian-Kovacs
(74) *Attorney, Agent, or Firm* — Defillo & Associates, Inc.; Evelyn A. Defillo

(57) ABSTRACT

A feeding device for a flexible canvas or draper harvester characterized by upper beam (8) linked to a lower front beam (10) and joined by side covers (11) forming a frame, integral with a lateral stud supports (12) and a central stud supports (13) associated with a central lower beam (9) cut into three sections; the central stud supports (13) are integral with the anchors of the coupling device (15) and with the flexible body supports (14); the central stud supports (13) and lateral stud supports (12) are linked to the conveyor belts with flexible canvases (3, 4, 5 and 6), forming a central body and two laterals with space to accommodate a double row.

1 Claim, 5 Drawing Sheets

(56) References Cited

U.S. PATENT DOCUMENTS

| | | | | |
|---|---|---|---|---|
| 4,938,010 | A | * | 7/1990 | Guinn .................... A01D 57/20 56/181 |
| 5,177,944 | A | * | 1/1993 | Finlay .................... A01D 57/20 56/365 |
| 2008/0161077 | A1 | * | 7/2008 | Honey .................... A01D 41/16 460/106 |
| 2013/0105282 | A1 | * | 5/2013 | Hoffman ................ A01D 57/20 198/814 |
| 2014/0096497 | A1 | * | 4/2014 | Bollin .................... A01D 43/06 56/10.6 |
| 2015/0156965 | A1 | | 6/2015 | Bertino |
| 2015/0272002 | A1 | * | 10/2015 | Honey .................... A01D 57/02 56/153 |

FOREIGN PATENT DOCUMENTS

| | | | | |
|---|---|---|---|---|
| AR | 087619 | | 4/2014 | |
| AR | 096498 | | 1/2016 | |
| CA | 2651756 | | 8/2009 | |
| GB | 2077562 | A * | 12/1981 | ............. A01D 57/20 |

* cited by examiner

FLEXIBLE HEAD PLATFORM OF CANVAS OR DRAPER WITH DOUBLE SWATHER AND ATTACHING DEVICE

FIELD OF THE INVENTION

In the field of agriculture, different types of flexible canvas head harvesters "draper", with conveyor belt and swather, are known. The present invention refers specifically to a flexible harvester head of the "draper" type, whose arrangement allows to form two rows associated with a coupling device to the propulsion vehicle, be it a harvester, three points of a tractor or swather to improve the function of uniform drying, especially in organic crops such as beans, chia, sesame, chickpeas, among others, which need special care in the collection treatment.

BACKGROUND OF THE INVENTION

Due to the advance in the consumption of organic foods, it was necessary to produce food using the least amount of phytosanitary products or avoid using them. In some organic crops such as beans, chia, sesame, chickpeas, among others, because of its way of maturing it is necessary to dry the plant, because if it is directly threshed without applying phytosanitary, there are green grains that will lower the quality of the harvested product. There are two methods to produce a uniform drying. One of them is to apply phytosanitary products, in this way, the plant gets dried, and then the direct threshing is produced using a harvester; by using this system considerable losses are obtained in the threshing and damage to the product having the risk of retaining the agrochemicals in the grains; another problem is that if the harvester is not properly regulated, it will yield poor grain quality. Another method for uniform drying of crops is to cut the plant once it is in its advanced state and form a row so that all its grains ripen uniformly, and then it is harvested and threshed, but usually, when forming a single row using heads greater than 25 feet, the cultivated material accumulates and does not dry uniformly obtaining a crop of poor quality. The treatment of the grains should be smooth so as not to produce an excessive shelling and in turn, produce a cut at ground level since the grains get stuck to the floor. At present, exists different types of platforms that produce the cut of the material and line up in a single row, the type of drag with a tractor, cut the plant, and by using a canvas align it on the side.

The solution proposed by the present invention is a flexible cutting head for lining up crops in two rows. It includes a main base or chassis and although it has a flexible and floating cutting system (previously requested patent by METAL NOET SRL—PATENT AR076116 A1), windmill, and a control system that are already in the state of the prior art. The object of the present invention is the chassis of the head whose arrangement with four sections of flexible canvas and multiple coupling devices of the pre-feeder type that allows linking the head to a harvester, three points of the tractor or swather. It is noted that the head includes an endless deliver and central canvas or floor, allowing to reduce the weight of the head according to the function to line up the crop.

In the search of antecedents made in the AR, US, and more than 90 country databases; depending on keywords identified: "swather", "windrower", "conveyor belt", "canvas", "draper", the following documents were found to be part of the state of the art. Document D1) AR076116 A1 of the same owner, METAL NOET S.R.L. that discloses a platform of rigid canvas of double control with flexible cutting bars with flexible arms composed by two subsets constructed of welded plates (F.2.1 and F.2.2), united by means of bolts and welded in its front part to the head of the body (F.2.5), where it links to the cutting system; an elastic sheet positioned in its central part (F.2.4) mechanically linked in its front part to the lugs of the structure (F.1.5) using a bolt or hinge (F.2.3); in its rear, a regulation (F.2.6), a rubber bushing type anti-vibration (F.1.3) that joins the body with a U of (F.1.4) integral with the structure; said U has holes that allow varying the position of the body. The present application claims a flexible arm to regulate the cutting of the height of a canvas head or "draper", located between the pre-feeder and the pan.

Document D2) AR075400 A1 of the holder ALLOCHIS, JOSE LUIS disclosing a flexible platform articulated to a conveyor belt applicable to a combine harvester, chopper and swather of the type that possesses conveyor belts for the transfer of the cereal characterized by comprising two parallel conveyor belts (1, 2) and adjacent to each other, having the belt (1) closest to the cutting blades mobility related to the remaining belt (2).

Document D3) AR087619 A3 of ALLOCHIS, JOSÉ LUIS, in addition to the patent document D2) which also mentions a flexible platform articulated to a conveyor belt applicable to a combine harvester, chopper and swather of the type that has conveyor belts for the transfer of cereal. Is characterized by comprising a plurality of conveyor belts (200) which are arranged on said platform (100), in the central portion of said platform there is a set of augers (400), which are composed of a main auger (410), at least one pair of oblique augers (420) and a secondary auger (430).

Document D4) AR040227 A1, in the name of PAILHE, HORACIO ALBERTO, mentions an agricultural swather machine to be coupled in various types of agricultural machines to achieve field seeding before harvesting, said machine being of the type comprising a frame main on which a crop reel is mounted and a blade for cutting said crop. Being the machine characterized in that it comprises at least one conveying means of the cut crop, said conveying means being commanded using movement actuators, wherein the nominal width of said means of transport is at least equal to the width of the said main frame.

Document D5) AR096498 A1 of INDUSTRIAS REUNIDAS COLOMBO LTDA, discloses a swather cutter implement for various crops, characterized in that it comprises: a tubular structure (1), practically in "U" cast formed by lateral tubes (2) parallel and aligned in the same plan and by a section of rear junction defined by two axial tubular segments (3) with an intermediate free space or gap (4) and, at this point, the structural interconnection is completed with an elevated part also tubular, usually trapezoidal (5), forming the raised rear part of said structure and constituting an outlet for the material arranged in sheaves while the front part is represented by the side tubes (2), with which the assembly assumes a practically "U" shape and is supported on the front running (6A) the rear running (6B), in which the first ones are mounted on the distal ends of the tubes (2), while the rear ones are mounted on the median stretches of the tubular segments (3); two sets of openers 7) integrated with vertical cutter assemblies (8), mounted on the front of each front runner (6A); A pick-up and lifter assembly extending over the entire width of the implement between the front runners (6A), as well as its ends are fixed in a sliding manner on swing arm (10) that extends over the side tubes (3), east arm with means so that said picker and lifter assembly (9) can be moved towards the front or back and upwards downwards in accordance with a desired adjustment consistent with the surface of the floor and in accordance with the plants that will be blinded and disposed in sheaves; a cutter assembly (11), balanced, also mounted along the entire transverse extension of the machine then after the front run (6A) and the picker/lifter assembly (9), forming a cross-cut line maintained on the ground and, for both said cutting assembly 5 is mounted under the structure (1) in a cooperative balanced manner so that the cutting line can accompany the ground level; and a sheaf forming assembly (12) positioned transversely between the cutter assembly (11) and the tube segments (3) of the structure (1).

Document D6) US2015156965 A1 to INDUSTRIAS REUNIDAS COLOMBO LTDA describes an implement for harvesting and crimping certain crops characterized by comprising: a tubular structure (1) in the form of a lying "U", composed of lateral tubes (2), parallel and aligned in the same plane and by a connecting rear portion formed by two tubular axial segments (3) with a separation or free section (4) between them. The structural interconnection is completed with a raised part, also tubular and of trapezoidal shape (5), which forms the high rear part of the said structure and which serves as an outlet for the material with rows. The front part, represented by the side tubes (2), with which the assembly takes the form of a "U" lying down and supported by the front wheels (6A) and rear wheels (66). The front wheels (6A) mounted on the distal ends of the tubes (2), while the rear wheels (6B) are mounted on the medium tubular segments (3); two sets of openers (7) integrated with the sets of vertical cutters (8), mounted on the front of each front wheel (6A); a collection and lifting assembly (9) that extends over the entire width of the implement between the front wheels (6A). Their ends mounted in an adjustable manner to the oscillating arms (10) placed on the side tubes (3). These arms allow said collection and lifting assembly (9) to move vertically and horizontally according to the desired adjustment consistent with the surface of the soil and according to the type of plant that is harvested and rowed; a collection assembly (11) assembled along the entire transverse extension of the machine, forming a cross-sectional line maintained on the ground. This harvesting assembly is assembled in the structure (1) in the manner of a spring that allows the cutting line to follow the level of the ground; a set of rows (12) positioned transversely between the collection assembly (11) and the tube segment (3) of the structure (1).

Finally, document D7) CA2651756 A1 to DEERE & CO also discloses an agricultural swather, comprising: a traction unit having a frame; a cutting platform having a longitudinal extension, a feeding opening associated with a first mounting location, and a first hooking on one end of said cutting platform associated with a second mounting location. A lifting assembly supported by said frame, said lifting assembly configured to be mounted with said cutting platform in said first mounting location; and an articulated transport arrangement mounted on said traction unit frame, said articulated transport arrangement including a second hitch configured to engage said first catch, and at least one actuator for coupling between and adjusting a relative angular orientation between said frame and said cutting platform when said first engagement and said second engagement gets paired together.

In the aforementioned documents D1, D2, D3, D4, D5, D6 and D7 the material is cut and they are lined up in a single row to any product, which means that in a head greater than 25 feet the material does not dry uniformly obtaining a serious damage in the grain of the organic products cited and a poor quality harvested product. A solution provided for a cutting head at ground level, producing a copy of the land, is to deposit the crop in two rows because these are of smaller volume, which allows a uniform drying and the special arrangement of the tarps or drapers allows a soft and adequate treatment and transport with less damage by handling the grain, especially in the mentioned crops; the present invention does not transport the cultivated material into the harvester and will only deposit it in the soil. The coupling device to the propulsion vehicle or pre-feeder has a structure that allows any propulsion vehicle, be it a harvester, three points of a tractor or swather, among others.

SUMMARY OF THE INVENTION

It is then an object of the present invention a feeding device for harvester of the flexible head type canvas or draper comprising an upper beam (8), linked to a lower front beam (10) and joined with side covers (11) forming the frame, integral with the lateral (12) and central stud supports (13) associated with a central lower beam (9) cut into three sections; the central stud supports (13) are integral with the anchors of the coupling device (15) and with the flexible body studs (14); the central studs support (13) and lateral (12) supports are linked to the conveyor belts with flexible canvases (3, 4, 5 and 6), forming a central body and two laterals with space to accommodate a double row.

DESCRIPTION OF THE DRAWINGS

For greater clarity and understanding of the object of the present invention, it has illustrated in several figures, in which the same has been represented in one of the preferred forms of embodiment, all by way of example, wherein.

DETAILED DESCRIPTION OF THE EXAMPLE OF REALIZATION

In order to make the present patent invention understandable so that it can be easily implemented, an accurate description of a preferred embodiment will be given in the following paragraphs, making references in there to the accompanied illustrative drawings, with character example merely demonstrative but not limited of the same, and whose components may be selected among different equivalents without departing from the principles established in this present documentation.

Figure 1:
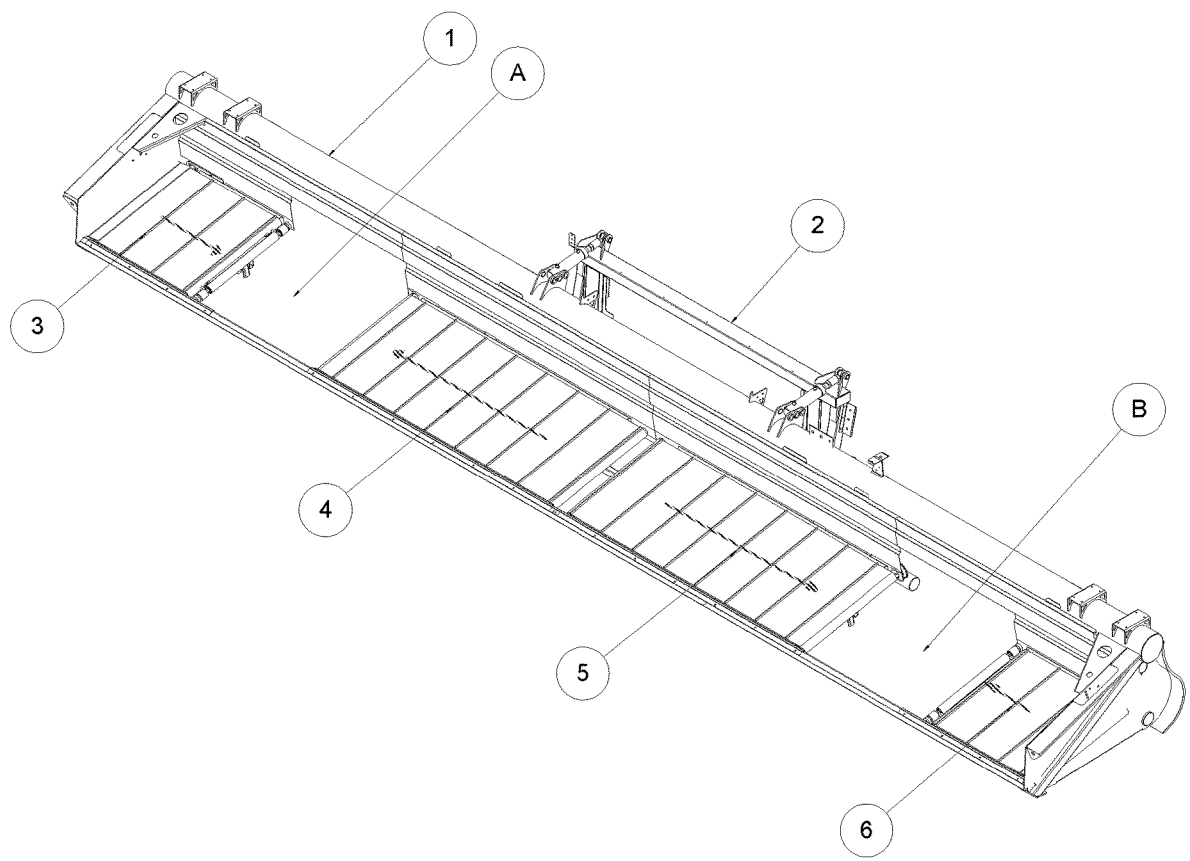
FIG. 1 is a general perspective view of the flexible head or draper with a two-row forming device (A, B) comprising a chassis or frame (1), a coupling device or pre-feeder (2) and four structures through which circulate the canvas (3, 4, 5 and 6).

Referring to FIG. 1, it illustrates a chassis or frame (1), a coupling or pre-feeder device (2), four structures for the canvases (3, 4, 5 and 6) and the spaces (A and B) circulate for the rows.

Figure 2:
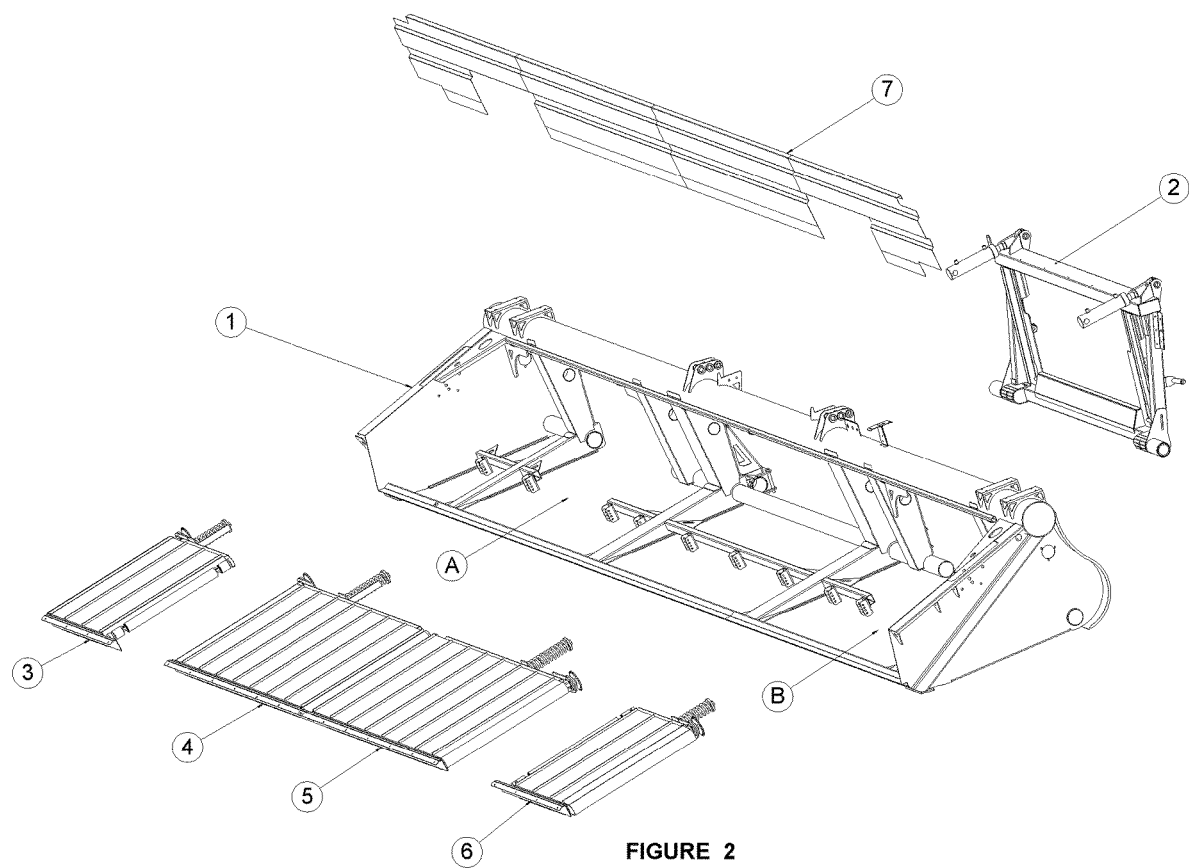
FIG. 2 is an exploded view of FIG. 1, comprising a chassis or frame (1), a coupling device or pre-feeder (2), four structures through which the canvas circulated (3, 4, 5 and 6) and a backrest (7).

FIG. 2 shows the chassis (1), the backrest (7) and the central studs that support the structure where the canvas is placed (3, 4, 5 and 6) from the center towards the ends (A and B) and from the ends to the center of the rows (A and B).

Figure 3:
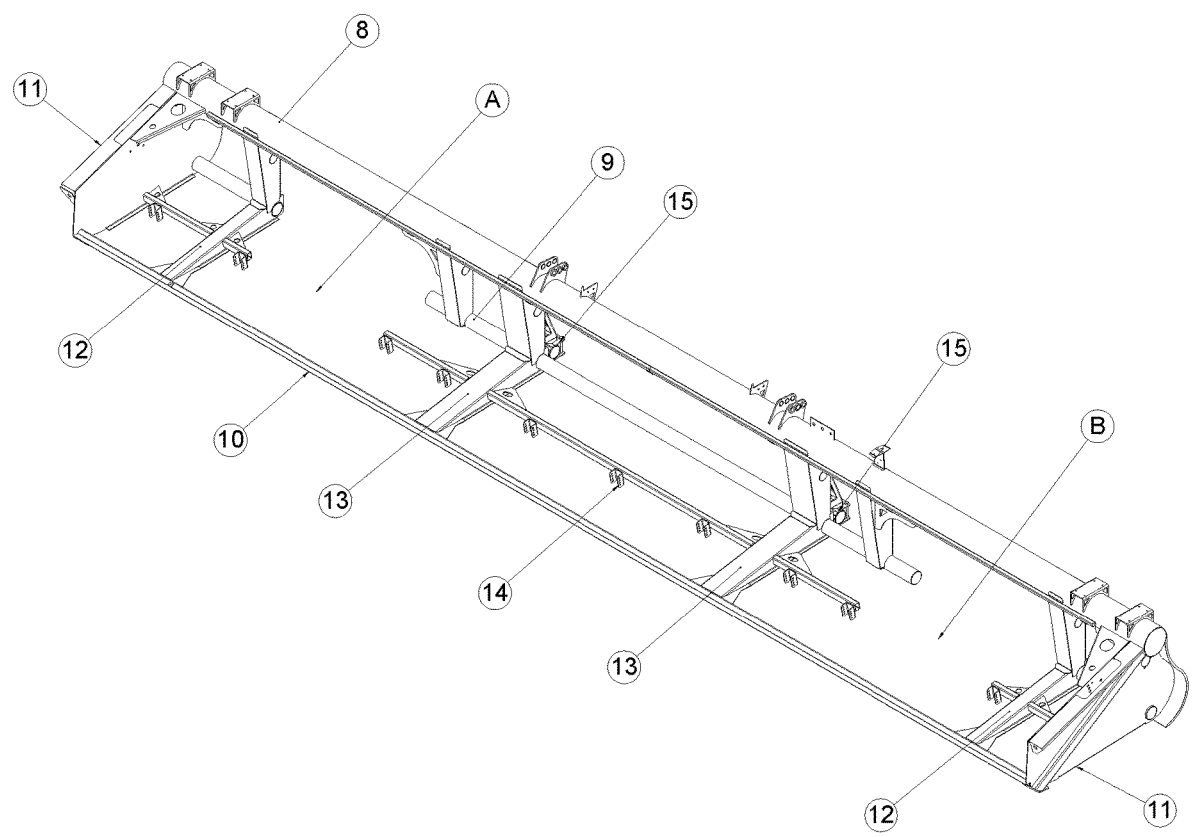
FIG. 3 is a detailed view of the chassis (1), including an upper beam (8), a lower center beam (9) cut into three sections, a front lower beam (10), two side covers (11), two lateral support studs (12), two central stud supports (13), supports for bodies and of the flexible (14), and anchors of the coupling device (15).

In FIG. 3, it can be seen the chassis (1) consisting of three supports or beams arranged an upper beam (8) linked to supporting studs in the form of "L" (12 and 13); the lateral stud supports (12) and central stud supports (13) are connected by a support bar for the flexible bodies (14); the lower central beam (9) is integral with the central studs (13) in its central section and has two lateral sections linked to the lateral support posts (12) leaving space for the rows (A and B); the anchors of the coupling device to the machinery (15) are integral with the central stud supports (13); the lateral sections of the lower central beam (9) are integral with the lateral stud supports (12) linked to the side covers (11) that make up the chassis.

Figure 4:
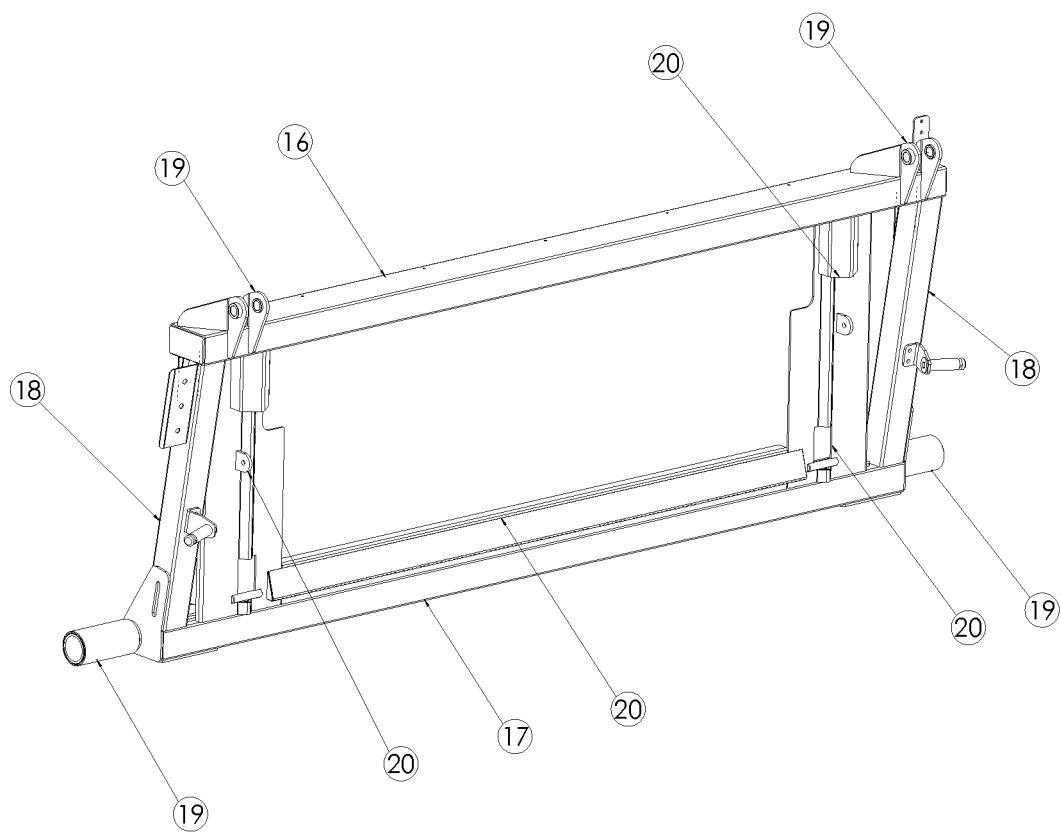
FIG. 4 is a detailed perspective view of the coupling device or pre-feeder (2) comprising an upper beam (16), a lower beam (17), two side frames (18), four attachments to the chassis (19), and parts to link the device to the propellant vehicle (20).

The coupling device according to FIG. 4, whose structure forms a frame composed of two lateral studs (18), a lower beam (17) and an upper beam (16). On the ends of the lower beam (17) two tubes are welded, which are the fixings to the chassis (19) and on the upper beam (16), two lugs (19) where the hydraulic cylinders are connected, which connects it with the upper beam (16) of the structure. In the frame, are mechanically linked the pieces (20) that allow to attach the device to the harvester.

Figure 5:
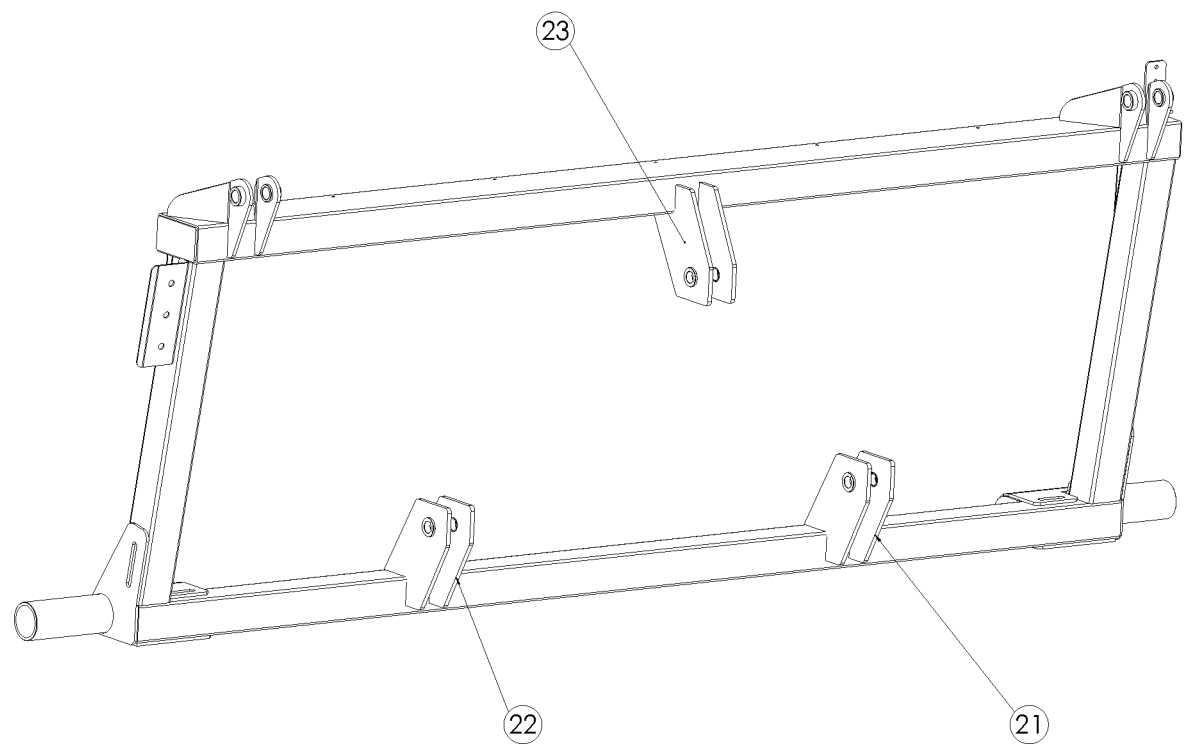
FIG. 5 is a detailed view of the coupling device for anchoring for three points, comprising anchoring fixings (21, 22 and 23).

In FIG. 5, the coupling device can be linked to the anchoring fixing parts (21, 22) in the lower beam (17) and the fixing part (23) is welded in the central part on the upper beam (16) that allows mounting to three points tractor device.

The configuration of the head comprises the configuration in three rows, to achieve that the head makes three rows (One on the left side, one on the right side, and one central), a row in the center of the head should be added. To achieve this, the left central canvas (4) and the right (5) are replaced by two canvases shorter on each side.

In the central part, a window is left to form the row; the right central canvas is replaced by the shorter canvas. The inside one is going to pull towards the center and the one from the outside towards the side. The same should be to perform on the left side, this way there are three rows, a right side, a central, and a left side. The configuration of the head includes the possibility of making the configuration of the head for a right row or a left row, to configure the head with only a right row, on the window (B) a fake structure is placed to circulate the canvas, and the side canvas (6) becomes a longer one, covering the hole (B). Then, the rotation of the left central canvas (4) is inverted, and in this way, the canvases (4, 5 and 6) throw all the material towards the hole (A) achieving a single row to the right. If we perform the same procedure on the right side and leave the left hole B, we only get one left row.

Having thus specially described and determined the nature of the present invention and the manner in which it is to be put into practice, it is claimed to claim as property and exclusive right:

1. A feeding device for a flexible canvas or draper harvester comprising:
    an upper beam (8) adapted to be placed on an open section of a chassis, the upper beam (8) is linked to a lower front beam (10) and joined by side covers (11) and forming a frame;
    a first and a second lateral stud supports (12), the first and the second lateral stud supports having an L-shape;
    a central lower beam (9) placed in parallel and under the upper beam (8);
    a first and second central stud supports (13) connected to the upper beam (8) and the lower front beam (10), the first and the second central stud supports (13) having an L-shape with a short side, a long side connecting to the short side on a connecting point, each one of central stud supports (13) is connected on the short side of the L-shape to the upper beam (8), on the long side of the L-shape to the lower front beam (10), on the connection point of the L-shape to the central lower beam (9), and middle section of the long side of the L-shape to a second side to flexible body supports (14);
    a first flexible canvas (3) supported by the first lateral stud supports (12);
    a second flexible canvas (6) supported by the second lateral stud supports (12);
    a third and a fourth flexible canvas (4,5) supported by the central stud supports (13);
    wherein the first flexible canvas forms a first lateral body on the frame, the second flexible canvas forms a second lateral body on the frame, and the third and the fourth flexible canvas forms a central body,
    wherein a first space is formed between the first lateral body and the central body creating a first row and a second space is formed between the second lateral body and the central body creating a second row;
    wherein the first flexible canvas and the second flexible canvas have a length shorter than a length of the third or the fourth flexible canvas;
    wherein the lower front beam is free of additional elements;
    wherein a first fake structure is placed on the second space transforming the head into a one right row head reversing the traction of a right central canvas (5); and
    wherein a second fake structure placed on the first space transforming the head into a one left row head reversing the traction of a left central canvas (4).

* * * * *